(12) United States Patent
Cook

(10) Patent No.: US 8,623,423 B2
(45) Date of Patent: Jan. 7, 2014

(54) BORON-CONTAINING COMPOSITIONS

(75) Inventor: Simon Gregson Cook, Guildford (GB)

(73) Assignee: U.S. Borax, Inc., Greenwood Village, CO (US)

( * ) Notice: Subject to any disclaimer, the term of this patent is extended or adjusted under 35 U.S.C. 154(b) by 482 days.

(21) Appl. No.: 12/808,795

(22) PCT Filed: Dec. 22, 2008

(86) PCT No.: PCT/GB2008/004224
§ 371 (c)(1),
(2), (4) Date: Aug. 3, 2010

(87) PCT Pub. No.: WO2009/081137
PCT Pub. Date: Jul. 2, 2009

(65) Prior Publication Data
US 2010/0291237 A1    Nov. 18, 2010

(30) Foreign Application Priority Data

Dec. 20, 2007  (GB) .................................. 0724905.5

(51) Int. Cl.
*A01N 59/14* (2006.01)
*A61K 33/22* (2006.01)

(52) U.S. Cl.
USPC ........................................................ 424/657

(58) Field of Classification Search
None
See application file for complete search history.

(56) References Cited

U.S. PATENT DOCUMENTS

| | | | |
|---|---|---|---|
| 4,721,693 A | 1/1988 | Lenk et al. | |
| 4,814,298 A | 3/1989 | Nelson et al. | |
| 5,019,160 A * | 5/1991 | Harada et al. | 75/564 |
| 5,304,516 A | 4/1994 | Clifford | |
| 5,362,687 A | 11/1994 | Tokunaga | |
| 5,447,891 A | 9/1995 | Spinosa et al. | |
| 5,677,250 A | 10/1997 | Knapp | |
| 6,132,832 A | 10/2000 | Crichton et al. | |
| 6,335,026 B1 * | 1/2002 | Katayama et al. | 424/409 |
| 6,362,119 B1 | 3/2002 | Chiba | |
| 6,922,007 B2 | 7/2005 | Geier et al. | |

FOREIGN PATENT DOCUMENTS

| | | |
|---|---|---|
| EP | 0 202 551 A2 | 11/1986 |
| EP | 0 509 792 A2 | 10/1992 |
| EP | 0 729 923 A3 | 9/1996 |
| EP | 1 867 608 A1 | 12/2007 |
| GB | 895293 | 5/1962 |
| GB | 928453 | 6/1963 |
| GB | 2 404 379 A | 2/2005 |
| JP | 1-290556 | 5/1988 |
| JP | 57027942 | 9/1993 |
| JP | 6-211559 | 8/1994 |
| JP | 8-138911 | 5/1996 |
| JP | 2004 107191 A | 9/2002 |
| JP | 2005 194319 | 7/2005 |
| KR | 1981-000059 | 2/1981 |
| KR | 1989-0006537 | 5/1989 |
| KR | 10-2004-0011885 | 2/2004 |
| RU | 389041 | 8/1993 |
| RU | 460262 | 9/1993 |
| RU | 472909 | 9/1993 |
| RU | 478794 | 9/1993 |
| RU | 1044609 | 9/1993 |
| RU | 2014293 C1 | 6/1994 |
| RU | 2 083 529 C1 | 7/1997 |
| SU | 390818 | 12/1973 |
| SU | 872476 | 10/1981 |
| SU | 1033464 A | 8/1983 |
| SU | 1154226 A | 8/1983 |
| SU | 1175904 A | 8/1985 |
| SU | 1248974 A1 | 8/1986 |

(Continued)

OTHER PUBLICATIONS

Definition of frit, American Heritage Dictionary downloaded Sep. 25, 2012 from http://education.yahoo.com/reference/dictionary/entry/frit.*
Definition of frit, Collins Dictionary of the English Language downloaded Sep. 25, 2012 from http://www.collinsdictionary.com/dictionary/english/frit].*
Definition of frit, Merriam-Webster Dictionary downloaded Sep. 25, 2012 from http://www.merriam-webster.com/dictionary/frit.*
Slag entry from Wikipedia, downloaded May 13, 2013 from en.wikipedia.org/wiki/Slag.*

(Continued)

*Primary Examiner* — Abigail Fisher
*Assistant Examiner* — Thor Nielsen
(74) *Attorney, Agent, or Firm* — Clark & Elbing LLP

(57) ABSTRACT

The present invention relates to boron-containing compositions. The invention relates to comminuted, heterogeneous boron-containing compositions which are obtainable by a process which comprises heating to a temperature sufficiently high that calcination occurs but insufficient for the formation of a homogeneous melt a mixture comprising components capable, under the conditions of heating, of forming the oxides $B_2O_3$ and $SiO_2$ and optionally $Al_2O_3$, $Na_2O$ and/or CaO in proportions such that the relative percentages by weight of the said oxides, based on the total weight of said oxides, are as follows: 5 to 35% $B_2O_3$; 10 to 65% $SiO_2$; 0 to 35% $Al_2O_3$; and up to 20% $Na_2O$ and/or up to 50% CaO; with the proviso that the said $B_2O_3$ content is not 10 to 18%, when the other contents are as follows: 40 to 65% $SiO_2$, 17 to 32% $Al_2O3$ 4 to 9% $Na_2O$, and 0 to 10% CaO, and then comminuting the resulting composition. By varying the proportions of the ingredients and the heating conditions, there may be obtained products of differing boron solubility characteristics according to the desired use of the products. Such compositions may be used as a source of boron in ceramics and heavy clay bodies, glass and fiberglass; in agriculture; as wood preservatives and pesticides; in polymers and rubbers; in wood, including wood-plastic composites; as flame retardant; in intumescent materials; in paints and coatings, in soaps and detergents; in cosmetics; in industrial fluids; in steel slag; in water treatment; and in gypsum wallboard as well as in glazes.

15 Claims, No Drawings

(56) References Cited

FOREIGN PATENT DOCUMENTS

| | | |
|---|---|---|
| SU | 1418301 A1 | 1/1987 |
| SU | 1544734 A1 | 11/1987 |
| SU | 1636360 A1 | 4/1989 |
| SU | 1682334 A1 | 11/1989 |
| SU | 1749194 A1 | 5/1990 |
| SU | 1799855 A1 | 3/1991 |
| SU | 2002711 C1 | 3/1992 |
| WO | WO 99/32282 | 7/1999 |
| WO | WO 01/04065 A1 | 1/2001 |
| WO | WO 2007/148101 | 12/2007 |

OTHER PUBLICATIONS

Kartal, "Characteristics and Advantages of a "Sinterit" Calcined Raw Material Mixture for Glazes," Process Engineering 79:E16, E18, E20, 2002.

Hu et al., "Optimization of $MgTiO_3$-$CaTiO_3$ Based LTCC Tapes Containing $B_2O_3$ for Use in Microwave Applications," Ceramics International 3:85-93, 2005.

* cited by examiner

BORON-CONTAINING COMPOSITIONS

CROSS-REFERENCE TO RELATED APPLICATIONS

This application is the U.S. national stage filing under 35 U.S.C. §371 of international application PCT/GB2008/004224, filed Dec. 22, 2008, which claims benefit of Great Britain Patent Application 0724905.5, filed Dec. 20, 2007.

The present invention relates to boron-containing compositions, the preparation of boron-containing compositions and the use of boron-containing compositions.

Boron-containing materials, both refined products and naturally occurring materials, are used in many applications ranging from ceramics and heavy clay bodies such as bricks, frits and glazes, glass and fiberglass, agriculture, wood preservatives and pesticides, polymers, rubbers, wood plastic composites, flame retardants, paints and coatings, soaps and detergents, cosmetics, industrial fluids, steel slag, water treatment, and gypsum wallboard.

The water solubility of borate material is an important characteristic. For some applications, it is desirable that the boron-containing compounds have very low solubility; in others, the compound must not be too insoluble in use to be effective; in others further, the solubility must not be too high such that the effect is too short lived. Solubility/rate of release is an important characteristic in the choice of a particular boron-containing component for a particular use.

Two commercial processes are commonly used to reduce the solubility of boron. These are 1) the production of boron-containing amorphous fits and glasses and 2) the production of crystalline boron-metal salts. Naturally-occurring boron-metal salts such as colemanite, ulexite, and hydroboracite are sometimes used where low solubility is desired but these materials have naturally occurring impurities such as arsenic that limit their use. Crystalline boron-metal salts typically contain water of hydration that is released during high temperature processing such as in polymer processing. The release of water of hydration by crystalline boron-metal salts at elevated temperatures limits the uses of these materials or requires further processing of these materials to remove the water of hydration. As an example, boron-metal salts including naturally occurring materials are calcined to remove water of hydration but this does not meaningfully reduce the solubility of the material.

For many applications it is desirable to use borate materials which have a solubility less than that of sodium borates and boric acid. For example, in glazes, frits are used to render boron and other constituents insoluble so that they do not migrate during the drying process and produce glaze defects. In agriculture, lower solubility and slower rates of dissolution can lead to slower sustained release and a lower risk of borate overdose. The current range of commercial products does not meet current needs. In wood preservation and pesticides, low solubility borates may allow the treated article and the pesticides to be used in weathering environments. In such applications, boron solubility is required to be such that it is high enough to provide efficacy but low enough to provide long-term durability. In wood plastic composites used in outdoor applications, low solubility borates provide long-term protection from biodegradation. As with wood preservatives, boron solubility is desired to be such that it is high enough to provide efficacy but low enough to provide long-term durability. In plastics, rubbers and polymers there are a number of water sensitive applications such as wire and cables for electrical and electronic applications. Metal-boron salts cannot always pass water immersion tests for wire and cable or high temperature, high humidity ("pressure cooker") tests for finished polymer products. As flame retardants, borates that have low solubility may be used in products intended for outdoor applications or in applications where water exposure is a risk. In paints and coatings, low solubility can provide long-term protection from microbial attack. The slight water solubility of metal-boron salts is known to destroy latex stability in some formulations and low water solubility is desirable in most water based formulations. In water treatment low solubility borates can be used to provide sustained release of borates. In gypsum wallboard, the use of low solubility borates can result in controlled migration of boron in the drying process.

Frit production requires the formation of a homogenous melt of the ingredients used. Typical fusion temperatures used are in the region of 1450-1500° C. Thus frit production has high energy requirements and requires attention to emissions. Accordingly it can be an undesirably expensive procedure.

Frits are typically used in glazes to render the desired soluble elements sodium, potassium and boron insoluble in water. They need to be insoluble since soluble elements will migrate during drying processes that give rise to glaze defects as well as the possibility of effluent problems as they would be present in wastewaters. The frit also ensures that the melting process commences at an early stage, before the glaze firing process itself. This ensures that high gloss in the glaze firing process is easily obtained.

Boron-metal salts such as zinc borate, copper borate, calcium borate may be prepared by a variety of procedures using conventional crystallization techniques. These compounds are generally prepared by dissolving borax (sodium pentaborate) and/or boric acid in water and adding a metal source. The metal source can be any number of materials such as metal oxides e.g. zinc oxide, or metal salts such as zinc sulphate, and may be obtained by in situ preparation of metal oxide or salt through the addition of an acid or a base. Regardless of the metal source, the preparation is generally carried out by reacting the materials in an aqueous solution, often at elevated temperature, for a period of time, followed by separation of the desired material by filtration and drying to remove the free water. In a commercial example, a crystalline zinc-borate salt is produced as batch processes involving rectors, centrifuge, dryer and grinder. In a commercial example, a crystalline zinc borate salt is produced in batch processes, where boric acid is reacted with zinc oxides in water at 90° C. to 100° C. to yield zinc borate slurry; the slurry is then centrifuged, and the solids dried and packaged for sale. In another commercial example, a refined calcium borate of the approximate composition of calcined colemanite, $2CaO.3B_2O_3.9H_2O$, is produced through a solution mining process. In another commercial example, calcined natural occurring minerals such as colemanite, hydroboracite and ulexite are produced through typical mining and calcinations processes.

Crystalline boron-metal salts, both natural and manufactured, are used to provide controlled release of boron. However, such materials have limitations in that their solubility is inappropriate for many applications and sub-optimal for many more. In wood preservation and wood-plastic composites, for example, zinc borate is commonly used to provide protection against biodegradation. Substitute materials have been investigated for lower cost but many of these materials have unacceptably high solubility resulting in low of durability or unacceptably low solubility resulting low efficacy.

The present invention relates to a comminuted, heterogeneous boron-containing composition (composition A), which composition is obtainable by a process which comprises heating to a temperature sufficiently high that calcination occurs but insufficient for the formation of a homogeneous melt a mixture comprising components capable, under the conditions of heating, of forming the oxides $B_2O_3$ and $SiO_2$ and optionally $Al_2O_3$, $Na_2O$ and/or CaO in proportions such that the relative percentages by weight of the said oxides, based on the total weight of said oxides, are as follows:

5 to 35% $B_2O_3$
10 to 65% $SiO_2$
0 to 35% $Al_2O_3$
0 to 20% $Na_2O$, and
0 to 50% CaO.

International Patent Application PCT/GB2007/002322 (unpublished) describes a boron-containing composition for use in glaze production, which composition is obtainable by a process which comprises heating to a temperature sufficiently high that calcination occurs but insufficient for the formation of a homogeneous melt a mixture comprising components capable, under the conditions of heating, of forming the oxides $B_2O_3$, $SiO_2$, $Al_2O_3$, $Na_2O$ and optionally CaO in proportions such that the relative percentages by weight of the said oxides, based on the total weight of the said oxides, are as follows:

10 to 18% $B_2O_3$
40 to 65% $SiO_2$
17 to 32% $Al_2O_3$
4 to 9% $Na_2O$, and
0 to 10% CaO.

There is also described a process for preparing such a boron-containing composition for use in a glaze composition, which process comprises heating to a temperature sufficiently high that calcination occurs but insufficient for the formation of a homogeneous melt a composition in particulate form comprising a mixture of components capable, under the conditions of heating, of yielding the oxides $B_2O_3$, $SiO_2$, $Al_2O_3$, $Na_2O$ and optionally CaO in proportions such that the relative percentages by weight of the said oxides, based on the total weight of the said oxides, are as follows:

10 to 18% $B_2O_3$
40 to 65% $SiO_2$
17 to 32% $Al_2O_3$
4 to 9% $Na_2O$ and
0 to 10% CaO, and then, comminuting the resulting composition. There are further described glaze compositions containing such boron-containing compositions, their use in glaze compositions and the glazing of ceramic articles.

According to an aspect of the present invention, there is provided a comminuted, heterogeneous boron-containing composition (composition B), which composition is obtainable by a process which comprises heating to a temperature sufficiently high that calcination occurs but insufficient for the formation of a homogeneous melt a mixture comprising components capable, under the conditions of heating, of forming the oxides $B_2O_3$ and $SiO_2$ and optionally $Al_2O_3$, $Na_2O$ and/or CaO in proportions such that the relative percentages by weight of the said oxides, based on the total weight of said oxides, are as follows:

5 to 35% $B_2O_3$;
10 to 65% $SiO_2$;
0 to 35% $Al_2O_3$; and
up to 20% $Na_2O$ and/or up to 50% CaO;
with the proviso that the said $B_2O_3$ content is not 10 to 18%, when the other contents are as follows:
40 to 65% $SiO_2$
17 to 32% $Al_2O3$
4 to 9% $Na_2O$, and
0 to 10% CaO,
and then comminuting the resulting composition.

The term "comminuted", in the context of a comminuted composition, typically refers to a composition that has been fractured to small pieces or particles by pounding, abrading, crushing, grinding or pulverizing. Typically, compositions are comminuted prior to formation of a slurry of the comminuted composition.

Typically, comminuted compositions have maximum particle sizes of 1 cm or less, more preferably of 1 mm or less, even more preferably of 500 μm or less, yet more preferably of 150 μm or less. More typically, comminuted compositions have maximum particle sizes of 45 μm or less. In some embodiments, comminuted compositions having particle size ranges of from 45 μm to 150 μm are preferred. Generally, comminuted compositions have minimum particle sizes of 0.45 μm or greater, preferably of 1 μm or greater, more preferably of 5 μm or greater, even more preferably of 10 μm or greater.

According to another aspect of this invention, there is provided a process for preparing a composition (composition B), heating to a temperature sufficiently high that calcination occurs but insufficient for the formation of a homogeneous melt a composition in particulate form comprising a mixture of components capable, under the conditions of heating, of yielding the oxides $B_2O_3$ and $SiO_2$ and optionally $Al_2O_3$, $Na_2O$ and/or CaO in proportions such that the relative percentages by weight of the said oxides, based on the total weight of said oxides, are as follows:

5 to 35% $B_2O_3$;
10 to 65% $SiO_2$;
0 to 35% $Al_2O_3$; and
up to 20% $Na_2O$ and/or up to 50% CaO;
with the proviso that the said $B_2O_3$ content is not 10 to 18%, when the other contents are as follows:
40 to 65% $SiO_2$
17 to 32% $Al_2O_2$
4 to 9% $Na_2O$, and
0 to 10% CaO,
and then comminuting the resulting composition.

According to the present invention, there may be obtained boron-containing compositions of different solubility characteristics.

The solubility characteristics can be determined to make the boron-containing compositions particularly suitable for their intended use.

It has been found by varying the preparation conditions and their composition that the boron-release characteristics of the products obtained can be varied.

It has been found in particular that by choice of heating temperature and, to a lesser extent, time, the ingredients used and their relative proportions there may be obtained compositions of different boron-solubilities. The surface area of the composition particles in use also affects their boron solubility behaviour. Based on these factors it is possible to control the boron-solubility of the product obtained from between for example 100% soluble (i.e. all of the boron in the composition is dissolved in water at room temperature in a given time frame) to about 0.1% soluble (i.e. only 0.1% of the boron is dissolved in water at room temperature in a given time frame). A typical solubility test would involve subjecting the composition, in powder form, to a leaching test.

According to the present invention, there may be provided materials with boron solubility ranging from that of the relatively high solubility of disodium tetraborate pentahydrate to that of the relatively low solubility of boron-containing frit.

The solubility can be controlled by changing the $B_2O_3$, $SiO_2$, $Al_2O_3$, $Na_2O$ and CaO compositions and the calcination conditions.

Generally speaking the higher the calcination temperature used the lower the boron-solubility of the composition obtained. Also, the bigger the size of the particles is the lower is the boron solubility.

The preparation method for the compositions according to the invention makes deliberate use of two low temperature eutectics for the $Na_2O.B_2O_3.SiO_2$.system (see G. W. Morey, J. Soc. Glass. Tech., 35, 270 (1051)) and for the $CaO.B_2O_3.SiO_2$ system (see E. P. Flint and L. S. Wells, J. Research Nat. Bur. Standards, 17 [5] 745 (1936); R. P. 941), the contents of which are incorporated herein by reference. Of these, the $Na_2O.B_2O_3.SiO_2$ system (with optional additions of $Al_2O_3$ and CaO) is capable of giving materials with solubility over a wide range. The $CaO.B_2O_3.SiO_2$ system is different as the eutectic is at a higher temperature (close to 1000° C.) and is not generally capable of yielding materials with a very low boron solubility.

The said oxides of the composition according to the invention preferably contain $Na_2O$, suitably in an amount of 2 to 20% by weight, and/or CaO, suitably in an amount of 5 to 50% by weight.

For the composition B according to the invention, the proportions of the said oxides may be as follows:
   5 to 35% $B_2O_3$
   10 to 65% $SiO_2$
   0 to 35% $Al_2O_3$
   above 9 to 20% $Na_2O$, and/or
   above 10 to 50% CaO.

The said oxides of the compositions according to the invention preferably include $Al_2O_3$, suitably with the said proportion being 10 to 35% by weight.

Suitably for composition B according to the invention the proportions of said oxides may be as follows:
   5 to 35% $B_2O_3$
   10 to 60% $SiO_2$
   10 to 35% $Al_2O_3$, and
   $Na_2O$ in an amount of 9.5% to 15%, and/or
   CaO in an amount of 11 to 50%.

In typical compositions B, the said proportion of the said oxides may be also as follows:
   (a) with $Na_2O$
      12 (e.g. 19) to 25% $B_2O_3$
      25 to 55% $SiO_2$
      20 to 35% $Al_2O_3$, and
      5 (e.g. 10) to 16% $Na_2O$.
   (b) with CaO
      10 to 30% $B_2O_3$
      12 to 42% $SiO_2$
      0 to 25% $Al_2O_3$, and
      30 to 50% CaO.
   (c) with $Na_2O$ and CaO
      5 to 20% $B_2O_3$
      45 to 65% $SiO_2$
      10 (e.g. 18) to 25% $Al_2O_3$
      2 to 10% $Na_2O$
      4 to 20% CaO.

The heating temperature referred to is suitably in the range 700 (e.g. 750)-1300° C., preferably 720 to 1120° C., e.g. 750 to 1000° C.

The proportions of the raw materials and their heat treatment may be chosen according to the intended use of the boron-containing products and in particular its desired solubility characteristics.

In the preparation of products according to the invention, the raw materials do not form a homogeneous melt on heating. This is in contrast with the production of flits which involve melting to form homogeneous glasses. Accordingly the boron-containing compositions according to the present invention can be manufactured at lower temperatures, and thus at less cost, than frits. The preparation of the composition according to the invention also contrasts with the production of crystalline boron-metal salts that require large quantities of water in the reaction process and significant energy to filter and dry the material.

The compositions of the invention are typically frit-free.

The term "heterogenous" typically refers, in the context of heterogenous compositions, to compositions comprising a plurality of nonuniform parts. Typically, said parts are nonuniform in structure and/or composition. This is in contrast to an essentially homogenous glass or frit, which comprises a cooled, uniform melt.

Raw materials used according to the present invention form $B_2O_3$, and $SiO_2$, and optionally $Al_2O_3$, $Na_2O$, and/or CaO under the calcination conditions. Most suitably there may be used a mixture of boric acid, which acts as a source of $B_2O_3$, sodium borate which acts as a source of $B_2O_3$ and $Na_2O$, kaolin, which acts as a source of $Al_2O_3$ and $SiO_2$, optionally quartz, which acts a source of $SiO_2$, and optionally either wollastonite or calcium carbonate or calcium hydroxide, which act as a source of CaO.

Boron gives a strong fluxing action in the calcination process. The boron compound should be used in powder form in order to obtain good mixing before calcination. Of the sodium borates, sodium tetraborate pentahydrate (borax pentahydrate), commercially available under the brand name Neobor®, is preferred. Borax decahydrate can also be used but is not as cost-effective as borax pentahydrate. Non-sodium borates such as boric acid, available under the brand name Optibor®, colemanite and ulexite are suitable for use e.g. when sodium is not required in the product obtained.

Silica ($SiO_2$) gives some glassy phase during calcination by reaction with the borate and any CaO source. If silica is not employed then the resulting composition would have the desired low water solubility, but may be too refractory for use. The particle size of the preferred quartz is important. If it is too large it does not react sufficiently during calcination, which gives rise to undissolved quartz particles in the calcined compositions. The preferred particle size for quartz as used in this invention is <400 mesh ($D_{50}$ 11 µm) e.g. Millisil C400 from Sifraco, Paris. In some cases alternatives to quartz may be desired for environmental reasons. Kaolin, feldspar, feldspathic sand or waste materials such as ground float or container glass cullet may also be used as sources of $SO_2$.

Kaolin is the preferred material to provide alumina ($Al_2O_3$) which generally imparts low water solubility to the boron-containing compositions of the invention. It also supplies all or part of the $SiO_2$ component. The quality of the kaolin (proportion of colouring oxides present as impurities) is suitably high, in order to minimise yellowing. Kaolin is used as a powder. The principal function of kaolin is to provide $Al_2O_3$ but there are suitable alternatives being other powdered materials rich in $Al_2O_3$ and low in iron, titanium and other colouring oxides to minimise undesired colouring. These are, for example feldspar, kyanite/andalusite/sillimanite (all $Al_2O_3.SiO_2$), mullite ($2Al_2O_3.2SiO_2$), calcined alumina ($Al_2O_3$), and alumina trihydrate ($Al(OH)_3$).

In general, kaolin gives good results and is the most economical way to add alumina.

However all kaolins, no matter how "clean" and high in quality, contain some colouring oxides as impurities such as $Fe_2O_3$ and $TiO_2$. The oxides can impart a slight yellow colour. In some applications, the yellow colour can be detrimental. In such cases, when it is necessary to partially or wholly replace kaolin in the formulation with alumina, thus avoiding the addition of colouring oxides, additional quartz will be required. This has an impact on the raw materials cost, which increases.

Wollastonite, calcium carbonate, and calcium hydroxide provide preferred sources of calcium oxide (CaO). The presence of CaO has a marked effect on the calcination temperature, reducing it by around 100° C. It also reduces the refractoriness of the final calcined borate.

The calcination temperature has been observed generally to have the greatest effect on the boron solubility of the product, than the other variables. Increasing the calcination temperature causes boron leachability (rate of release of boron) to decrease markedly. Increasing the boron content and the NaO content in the product, also causes boron leachability (rate of release of boron) to decrease.

$Al_2O_3$ is preferably present in the composition according to the invention. Its presence reduces glass formation and generally facilitates the calcination reaction. $Al_2O_3$ may also have a solubility reducing effect.

CaO may generally be used instead of $Na_2O$ when higher solubility is required.

$SiO_2$ content, in particular level of use of quartz in the starting materials, generally reduces boron-solubility but only to a very small extent.

By way of example an increase in calcination temperature of 100° C. can decrease the boron solubility/leachability of about 3.1%; an increase in the amount of sodium borate used of 10% by weight may result in an increase in boron solubility/leachabiity of about 0.4%; an increase in the amount of quartz used of 10% by weight may result in a decrease in boron solubility/leachability of about 0.02%; and an increase of the amount of kaolin used of 10% by weight may result in a decrease in boron solubility/leachability of about 0.4%. (These estimates assume that the remaining ingredients are correspondingly reduced in amount but used in the same ratio.)

An average boron leachability for product according to the invention is generally in the region of 5 to 6%. It can thus be seen that the calcination temperature typically has a larger effect in boron leachability than do the other variables.

Increasing the amount of sodium borate used generally causes boron leachability to increase, as may be expected from the higher boron content in the calcined product. The amount of quartz employed generally has little effect on boron leachability. Increasing the amount of kaolin used generally causes leachability to decrease. This is believed to be due to the alumina content of kaolin, which increases the chemical durability of the boron-containing glassy phase formed during calcining, making the boron less accessible to leaching.

Quartz and clay may also have other effects in the calcining process. Quartz reacts with sodium borate in the formulation at a low temperature (the eutectic is at 577° C.) and this reaction gives a good degree of glass formation in the calcined product. The more quartz and sodium borate in the raw material batch, the more glass there will generally be in the calcined product (glass content increases with temperature also). In fact, with a quartz/sodium borate mixture it is easy to transform the entire batch to glass at a relatively low temperature (below 800° C.). This is not necessarily desirable since the material is very difficult to handle during and after calcining.

Kaolin counters the effect of quartz on glass formation (as well as reducing boron leachability). Kaolin is a refractory material due to its high alumina content, and for this reason it reduces the tendency for the raw material batch to form large amounts of glass phase on heating. This is a useful effect since the material is much easier to handle during and after calcining. A proportion of kaolin in the raw material batch is often beneficial.

The heating of the raw materials is to a temperature sufficiently high to achieve calcination, whereby water and carbon dioxide are driven off. The temperature however is not so high as to result in the mixture becoming molten. The mixed raw materials, in finely divided form, are typically heated to a temperature of 700, e.g. 750, to 1300° C. e.g. for example 720 to 1120° C. or 750 to 1000° C. In the event that temperatures towards the higher end of the range may be used, shorter heating times may be employed. Under the heating conditions there may be some interaction between the oxides formed and the product may be generally partly crystalline and partly glassy. The nature of this interaction is however not fully understood. However, it is discovered that for any composition, the solubility is reduced as the temperature is increased and that a significant drop in solubility occurs when the calcination temperature is raised above 750° C.

The boron-containing compositions according to the invention are prepared by heating to a temperature sufficiently high that calcination occurs but insufficient for formation of a homogenous melt, suitably to a temperature of 700, e.g. 750 to 1300° C., for example 720 to 1120° C. or 750 to 1000° C. This gives materials which can have boron solubility above or below that of boron-metal salts that are naturally occurring such as colemenite or man-made such as zinc borate, and which can as low as that of a boron-containing frit.

For small-scale production, the compositions according to the present invention may be made by first dry mixing the finely divided raw materials. Water is added slowly while mixing the materials until they form a crumb. Qualitative observation is used to determine when to stop adding water, with final amount recorded by weight. The resulting mixture is optionally dried e.g. at 100° C. until all water has been removed or at 60° C. overnight. Calcination may be carried out by placing the dried crumb in a suitable receptacle, such as a fireclay crucible, and firing it in a furnace, typically an electric muffle furnace. A typical heating cycle involves a ramp-up of 8-10° C. per minute to the selected temperature, holding the temperature to the desired calcination temperature for 60 to 90 minutes, and then cool-down at a rate of some 10° C. per minute. After the heat treatment the material is removed from the receptacle and crushed carefully.

For large-scale production of compositions A, including compositions B, the production process generally comprises five major steps; these are 1) blending and wetting of starting ingredients, 2) compaction of blend, 3) optional product drying after compaction, 4) calcination, (without formation of a homogeneous melt) of the compacted product, 5) grinding and screening. Conventional blending, drying and grinding techniques can be used and various compaction and calcination techniques may be applied. However it is found that agglomeration of certain constituents, notably $B_2O_3$, and the sticking of these materials to refractory calcination equipment can be a serious problem in industrial scale application of the technology. It has surprisingly been found that 1) adding a refractory powder, e.g. a free kaolin or alumina powder, to a compacted pellet feed in a rotary calciner, or 2) production of pressed tiles from the composition to be calcined and running the tiles through a roller kiln having a temperature profile different from that used for making clay tiles can be used to reduce or avoid the undesired agglomeration.

According to a further aspect of the present invention, there is provided a process for preparing comminuted, heterogeneous boron-containing compositions A, including Compositions B, which process comprises heating in a rotary calciner in the presence of refractory powder to a temperature sufficiently high that calcination occurs but insufficient for the formation of a homogeneous melt a composition in particulate form comprising a mixture of components capable, under the conditions of heating, of yielding the oxides $B_2O_3$ and $SiO_2$ and optionally $Al_2O_3$, $Na_2O$ and/or CaO in proportions such that the relative percentages by weight of the said oxides, based on the total weight of said oxides, are as follows:

5 to 35% $B_2O_3$
10 to 65% $SiO_2$
0 to 35% $Al_2O_3$
0 to 20% $Na_2O$, and
0 to 50% CaO, and then comminuting the resulting composition. A specific such process comprises the following steps:

1) blending and wetting a composition in particulate form comprising a mixture of components capable, under the conditions of heating, of yielding the oxides $B_2O_3$ and $SiO_2$ and optionally $Al_2O_3$, $Na_2O$ and/or CaO in proportions such that the relative percentages by weight of the said oxides, based on the total weight of said oxides, are as follows:
   5 to 35% $B_2O_3$
   10 to 65% $SiO_2$
   0 to 35% $Al_2O_3$
   0 to 20% $Na_2O$, and
   0 to 50% CaO;
2) compacting the blend so formed;
3) optionally drying the compacted products;
4) heating the compacted product in the presence of refractory powder e.g. free kaolin or aluminia powder, in a rotary calciner, to a temperature sufficiently high that calcination occurs but insufficient for the formation of a homogeneous melt; and
5) comminuting, e.g. by grinding and screening, the resulting product.

For the production of the composition using a rotary kiln, the raw materials can be milled and mixed in a blender using conventional production equipment and techniques. Water is typically sprayed onto the product during mixing. Water addition can vary from 2% to 20% by weight. The composition is formed into pellets. The pellets can be made by in conventional manner, e.g. using pellet manufacturing methods used in the feedstuff industry. In such a case, the mixture may typically be forced with rollers and extruded through dies to form spaghetti form strands and cut to appropriate length. The particles may be dried to less than 1% by weight moisture with conventional apparatus such as a fluid bed dryer. The dried pellets are suitably calcined in a rotary kiln with direct heat in a counter current flow to the hot gases. The pellets can also be directly calcined without any drying with the starting moisture content ranging from 2% to 20%. Rotary kiln properties are generally important to satisfactory production and it has been found that kilns with length-to-diameter ratio of 10 or more, a gradient of 2% to 3%, and turning speed of 0.5 to 3 rpm are desirable. The kiln is suitably equipped with a refractory covering specific to the product to be calcined. Heating may be provided by natural gas or propane burners.

According to one embodiment of the preparation method a preferably fine, refractory powder such as kaolin or alumina is fed into the kiln and mixed with the pellets to ensure free flow by preventing the pellets from sticking to kiln walls and/or among each other. The additive rate ranges from 5% to 25% by weight according to product residence time and the steering temperature (the maximum temperature which causes reaction). The mixture of pellets and additive is suitably heated to a maximum set point in the 700° C. to 1300° C. range but the maximum temperature set point, temperature gradient, and residence time are determinant variables in the solubility properties of the product obtained. The additive is not modified during the calcination process and remains as a powder. When exiting the kiln, the product is cooled down in a cooling tube (room temperature plus 20° C.) and screened to remove the excess additive. The screened additive can be recycled.

According to yet a further aspect of the present invention, there is provided a process for preparing a comminuted, heterogeneous boron-containing compositions A, including compositions B, which process comprises heating in a roller kiln to a temperature sufficiently high that calcination occurs but insufficient for the formation of a homogeneous melt a composition in particulate form comprising a mixture of components capable, under the conditions of heating of yielding the oxides $B_2O_3$ and $SiO_2$ and optionally $Al_2O_3$, $Na_2O$ and/or CaO in proportions such that the relative percentages by weight of the said oxides, based on the total weight of said oxides, are as follows:

5 to 35% $B_2O_3$
10 to 65% $SiO_2$
0 to 35% $Al_2O_3$
0 to 20% $Na_2O$, and
0 to 50% CaO, and then comminuting the resulting composition. A specific such process comprises the following steps:

1) blending and wetting a composition in particulate form comprising a mixture of components capable, under the conditions of heating, of yielding the oxides $B_2O_3$ and $SiO_2$ and optionally $Al_2O_3$, $Na_2O$ and/or CaO in proportions such that the relative percentages by weight of the said oxides, based on the total weight of said oxides, are as follows:
   5 to 35% $B_2O_3$
   10 to 65% $SiO_2$
   0 to 35% $Al_2O_3$
   0 to 20% $Na_2O$, and
   0 to 50% CaO;
2) forming the blend so formed into tiles;
3) optionally drying the tile formed product;
4) heating the tile formed product in a roller kiln to a temperature sufficiently high that calcination occurs but insufficient for formation of a homogeneous melt; and
5) comminuting, e.g. by grinding and screening, the resulting product.

For the production of the composition using a roller kiln (a kiln typically used to make ceramic tiles), the raw materials may be milled and mixed in a conventional apparatus. Water is typically sprayed onto the product during mixing. Water addition suitably varies from 10 to 15% by weight. The composition may be pressed into tiles whose size varies from 5×10 cm to 30×30 cm and thickness 10 to 20 mm with 350 kg/cm² pressure. The tiles can suitably be either dried down to less than 1% moisture or fired just after pressing. Best results are generally obtained with tiles pressed with 10% moisture and fired without drying. For better handling and to avoid sticking on rolls during firing, tiles are laid down on refractory support. During firing, product is typically gently heated from room temperature to 540° C. for 100 minutes. The product is then quickly heated up to 1050° C. within 10 to 15 minutes and remains at maximum temperature for 10 minutes. To ensure quenching the product is quickly cooled down to room temperature within 15 to 20 minutes.

To reduce energy consumption, materials cost, and handling, the composition can be alternatively handled without refractory support. In this method, a blend of product is loaded on to the mould cavity at the desired thickness (20-40 mm as soft layer). A thin layer of kaolin of 0.5 to 2 mm is then laid down on the product layer and pressed all together (350 kg/cm2). Tiles are automatically turned upside down so that the kaolin layer is on the bottom to prevent the composition from sticking on rolls during firing. Additives, such as bentonite (organic binders and/or plasticizers) can be blended (0.5 to 3% by weight) in the kaolin layer to improve its plasticity and reduce difference in thermal coefficient expansion with product body. Alternatively, kaolin can be wet sprayed in thinner layer (0.2-0.3 mm) with a slurry containing CMC (carboxymethylcellulose); the slurry containing (68-72% kaolin plus 0.3-0.5% CMC). The mould shape can be adjusted to facilitate tile release (and should at least have 2° of inclination). Blend moisture content, drying conditions and firing cycle are variables that are adjusted according to the composition and equipment.

Suitably the raw materials used in these methods comprise:

| | |
|---|---|
| Borate (sodium or non-sodium) | 10-60% |
| Quartz | 0-60% |
| Kaolin | 0-80% |
| Wollastonite | 0-60% |
| Calcium carbonate | 0-50% |
| Calcium hydroxide | 0-15%. |

Typically the sum of the calcium sources (wollastonite, calcium carbonate and calcium hydroxide) comprises 0 to 80% by weight of the raw materials. Also typically there must always be used some quartz and/or kaolin.

The boron-containing composition A and B according to the present invention may be used in applications where controlled leachability of boron is desired. These include heavy clay bodies such as bricks, frits and glazes, agriculture, wood preservatives and pesticides, wood plastic composites, polymers, rubbers, polymers, flame retardants, paints and polymer coatings, soaps and detergents, cosmetics, industrial fluids, steel slag, water treatment, and gypsum wallboard.

In particular boron-compositions B according to the invention can be used in frit-free glaze compositions to provide boron-containing glazes with low boron solubility for general use in glazing compositions.

Boron-containing compositions B according to the invention can be used in frit-free glaze compositions having excellent gloss and durability meeting the requirements of traditional glaze compositions.

Boron-containing compositions B according to the invention can be used in the glazing of ceramic articles with frit-free glaze compositions that meet the criteria of conventional frit-containing glaze compositions.

Boron-containing compositions B according to the invention can be used in total or partial replacement of frits in glaze compositions.

Boron-containing compositions B according to the invention can be used in frit-free glaze compositions which provide glazes having a boron solubility as low as that of boron-containing frits and much lower than previously described frit-free compositions.

According to an aspect of the invention, there is provided a glaze composition, suitably a frit-free or boron-free frit containing glaze composition, containing a boron-containing composition B according to the invention.

According to another aspect of the invention, there is provided the use of a boron-containing composition B according to the invention in a glaze composition, suitably a frit-free or boron-free frit-containing glaze composition.

According to a yet further aspect of the invention there is provided a method of glazing a ceramic article which method comprises applying to a surface of the ceramic article a glaze composition according to the invention, and firing the ceramic article.

The invention also provides a ceramic article glazed by the method according to the invention.

The raw materials do not form an homogeneous melt on heating. This in particular contrasts with the production of frits which involve melting to form homogeneous glasses. Accordingly the boron-containing compositions B according to the present invention can be manufactured at lower temperatures, and thus at less cost, than frits.

Further, problems associated with boron emissions from frit furnaces may be substantially eliminated according to the invention. The calcination temperature may be typically 500° C. lower than a typical frit fusion temperature, and the calcination time is around 70% shorter than that for frit manufacture. This gives a very significant reduction in the energy required to produce a ceramic glaze without affecting the energy required to fire the glaze, i.e. the glazing process is essentially the same for both conventional frit-containing glazes and those according to the invention.

The cost of glazes containing the compositions according to the invention is typically lower than for conventional fritted glazes. This is because the amount of the calcined composition in the glaze is generally lower than the amount of frit required in conventional glazes. The overall cost of the calcined composition may also be lower than the cost of a frit, depending on the composition of the frit.

Glazes according to the present invention normally comprise the glaze component according to the present invention, an optional frit component, clay and all other minor amounts of additives, dispersed in water forming a slurry.

Typically, for glazing, a glaze composition according to the invention in the form of a slurry, having a solids content of between 65 and 70%, is coated on a pressed and dried green body, and the coated ceramic body is fired at a temperature of between 1100 and 1200° C. Ceramic bodies which may be glazed according to the present invention include wall tiles and floor tiles and these may be, according to the composition of the glazed used, be provided with a glossy, matt or satin appearance.

The glaze compositions of the invention can also be applied to engobes. An engobe is an opaque coating that is often applied to the tile body before glazing. Its function is to mask the tile body, for example, when it is produced using red clay. Engobes conventionally contain frits and raw materials but the frit content is typically much lower than in a glaze.

It is possible to produce a range of glazes for floor tiles for example, with a single boron-containing composition according to the invention. This is achieved by modifying the proportions of the other ingredients used in the glaze. This is not possible to the same degree with frits. Hence, it is possible to replace some or many frit compositions with a single composition according to the invention.

The visual appearances of glazes achieved with the composition according to the present invention are very similar to those achieved with conventional frit-based glazes.

According to yet another aspect of the present invention, there is provided the use of a comminuted, heterogeneous boron-containing compositions A, including compositions B,
  as a source of boron
  in heavy clay bodies, glass and fiberglass;
  in agriculture;
  as wood preservatives and pesticides;
  in polymers and rubbers;
  in wood, including wood-plastics, composites;
  as flame retardant;
  in intumescent materials;
  in paints and polymer coatings,
  in soaps and detergents;
  in cosmetics;
  in industrial fluids;
  in steel slag;
  in water treatment; and
  in gypsum wallboard.

The present invention also provides use of compositions A, including compositions B,
  as a source of boron
  in heavy clay bodies, glass and fiberglass;
  in agriculture;
  as wood preservatives and pesticides;
  in polymers and rubbers;
  in wood, including wood-plastics, composites;
  as flame retardant;
  in intumescent materials;
  in paints,
  in soaps and detergents;
  in cosmetics;
  in industrial fluids;
  in steel slag;
  in water treatment; and
  in gypsum wallboard.

Compositions A, including compositions B, according to the invention may be used as preservatives and pesticides in wood composite products and wood-plastic composite products where suitably they can be used in loading from 0.2% to 3.0% by weight, typically from 0.5 to 2% by weight, preferably from 0.75 to 1.5% by weight, as boric acid equivalent (BAE) to achieve the appropriate level of biodegradation protection. In some embodiments, 0.75% BAE is preferred. In other embodiments, 1.5% BAE is preferred. Due to recent changes in the species, size and quality of standing timber available for harvest throughout the world, composites of lignocellulosic materials have replaced traditional solid sawn lumber for use in many structural applications. Many of these composites are used in applications which require resistance to wood-destroying organisms such as fungi and various insects. Accordingly, this requires treatment with a wood preservative. Traditionally, solid wood products are dipped or pressure treated with aqueous solutions of preservative chemicals. Other than plywood, this is not possible with wood composites due to irreversible swelling of the wood substrate. In the case of wood-plastic composites (WPCs), the hydrophobic nature of the substrate precludes the use of conventional preservative treatment.

However, the nature of a composite material makes it possible to incorporate a preservative into the product during its manufacture. This has been carried out for a number of years using low solubility borates such as zinc borate 2335 ($2ZnO.3B_2O_3.3.5H_2O$; sold commercially as Borogard® ZB, U.S. Borax) to provide protection against wood destroying organisms. While zinc borate is suitable as a composite preservative, there is still enough inherent solubility of the biocidal boron components to limit the use of zinc borate-treated wood composites to protect above-ground applications such as exterior siding or, in the case of WPCs, as unprotected above-ground decking. According to the present invention, there may be used boron-containing compositions with appropriate solubility such that extended period of protection can be achieved, even when the WPC is to be used where there is significant moisture contact. The American Wood Protection Association (AWPA) has established a Use Category System (UCS) to help differentiate end-use applications for different wood commodities, which helps to identify the appropriate preservative which can be used to protect the given commodity. The UCS can be thought of as a continuum which goes from least hazardous (UC1—wood used in dry, protected above-ground applications) to most hazardous— for example, wood pilings used in a tropical salt water environment (UC5). Treated composites such as exterior siding (UC3A) and unprotected, above-ground decking (UC3B) can also be described in the UCS. Whereas the low solubility of zinc borate has made it possible for zinc borate treated composites to be used in hazardous applications such as siding and above-ground decking, the inherent solubility of the biocidal boron has precluded the use of zinc borate as preservative treatment for ground contact (UC4) or freshwater/marine applications (UC5). It is widely accepted that UC4 and UC5 applications expose a wood composite commodity to significant contact with moisture, leading to a scenario whereby it is possible for the boron component to deplete (leach) from the treated article, eventually leading to a loss in efficacy and precluding the use of a low solubility boron compound such as zinc borate in such an application. In ground contact applications (UC4) of zinc borate treated wood composites such as OSB (Oriented Strand Board), the rigorous, continually wet conditions create an environment whereupon the boron eventually depletes from the sample, leading to a scenario whereby the decay fungi are able to colonize the sample and metabolize the wood component, leading to failure. Low solubility boron-containing compositions according to the invention may be used on a wood-composite or WPC to provide long-term control of decay and termites in a ground contact applications while retaining enough boron to provide this protection for many years. Further, in applications where zinc borate is currently successfully used such as in wood composite exterior siding or WPC above-ground decking, the present invention provides material that is less expensive and does not contain a heavy metal such as zinc.

Compositions A, including compositions B, according to the invention may be used in heavy clay bodies to benefit from the use of boron-containing materials as fluxes. Such use is not widespread today for two reasons: i} the availability of other, more cost effective fluxes; ii) the solubility of many boron-containing materials gives undesirable side effects in processing, for example adverse effects on slurry or body rheology. However, with the control of the solubility of boron according to the invention, industrially beneficial effects e.g. in brick and porcelain ceramics used in food service can be achieved. In bricks 0.05% to 0.4% $B_2O_3$ can reduce energy consumption, increase furnace productivity, and allow more cost effective clays to be used. In porcelain ware for the food service industry, 0.5 to 1.5% $B_2O_3$ has been shown to allow body reformulation to reduce deformation and losses during the firing process.

Compositions A, including compositions B, according to the present invention may be used to deliver boron compounds at a controlled rate to plant life. At present, refined sodium borate salts are used to provide quick release of boron to plants through foliar and ground applications. As well some mineral borates such as ulexite are used to provide slower release of boron to plants compared to sodium borates. However, these mineral borates simply provide slower release and not controlled release as may be desired. Materials of the present invention can be designed to have release that is slow enough such that the product is required to be applied every few years rather than every growing season. This has implication for all agriculture but may be particularly useful in forestry, where large areas make it uneconomical to apply a fertilizers every year, in orchards, which may not require fertilizer additions every year, in crops for biofuels such as ethanol and biodiesel, which may be grown over large areas on poor quality land, and in garden and potted plant, where long-lasting fertilizer stakes are used. The typical boron addition rates range from 0.3 to 9 kg of elemental boron equivalent per hectare per year, depending on the requirements of the plant and the boron deficiency of the soil.

Compositions A, including compositions B, according to the invention may be used in various polymer and rubber applications as flame retardants and smoke suppressants. These include 1) halogen-free wire and cable and electrical and electronic parts composed of polyolefinic materials such as polypropylene, ethylene vinylacetate, or polyethylene having a loading of 3 to 50% by weight of composition A of the present invention in conjunction with alumina trihydrate or magnesium hydroxide and processed at temperatures ranging from 150° C. to 260° C.; 2) electrical and electronic materials composed of polyamides 66, polyamide 6, polybutylene terephthalate, polypropylene oxide, polycarbonate (PC), acrylonitrile-butadiene-styrene (ABS), PC/ABS, high impact polystyrene or their alloys having a loading of 1-25% by weight of composition A of the present invention in conjunction with brominated polystyrene or other organohalogen sources and processed at temperatures ranging from 220° C. to 340° C. (materials of present invention will also include its use in conjunction with halogen-free additives such as diethyl aluminophosphinate, red phosphorous, phosphate esters, or magnesium hydroxide); 3) roofing membranes composed of rubber modified asphalt having a loading of 3 to 30% by weight of composition A of the present invention in conjunction with colemanite or other co-additives and processed at temperatures ranging from 160° C. to 240° C.; 4) roofing membranes composed of thermoplastic polyolefin having a loading of 2 to 30% by weight of composition A of the present invention in conjunction with magnesium hydroxide and processed at temperatures ranging from 190° C. to 220° C.; 5) sealants and caulking composed of acrylics and polyurethanes and having a loading of 3 to 30% by weight of composition A of the present invention in conjunction with ammonium polyphosphate (APP) and processed at temperatures ranging from room temperature to 80° C.; 6) panelling and wooden door composites comprising polyurethane resin, phenolics or other binder and having a loading of 1 to 60% by weight of composition A of the present invention in conjunction with alumina trihydrate and processed at temperatures ranging from room temperature to 120° C.; and 7) wire and cable, conveyor belts and other similar materials composed polybutadiene BR/SBR, ethylene propylene diene monomer (EPDM), silicone, and PVC-nitrile having a loading of up to 40% by weight of composition A of the present invention in conjunction with alumina trihydrate or magnesium hydroxide and processed at temperatures ranging from 110° C. to 240° C.

Compositions A, including Composition B, may be used as a flame retardant/smoke suppressant filler in unsaturated polyesters, epoxy, or phenolic thermosets. The loading could be 1 to 60% by weight in conjunction with alumina trihydrate or other fire retardant fillers.

Compositions A, including Compositions B, may be used in intumescent polymer coatings composed of acrylic and epoxy materials and may have a loading of up to 30% by weight in conjunction with ammonium polyphosphate (APP) and processed at temperatures ranging from room temperature to 100° C.

Compositions A, including Compositions B, may be used as infra-red light absorbers in agriculture thermal film e.g. composed of polyethylene or ethylene-vinyl acetate and having a loading of 2% to 15% by weight of composition A and processed at temperatures around 200° C.

Compositions A, including Compositions B, may be used as biocides and corrosion inhibitors in water treatment systems. The compositions may be used as in re-circulating water systems such that the controlled solubility of the present invention provides both the required borate concentration for efficacy and a reservoir effect for ease of use.

The invention also provides materials containing compositions A, including compositions B, as boron source for any of the above uses.

The invention is illustrated further by reference to the following examples.

In the Examples in the measurement of solubility the solution samples were analysed using a Thermo IRIS Intrepid II XSP Inductively Coupled Plasma (ICP) spectrometer. The amount of boron entered into solution as a proportion of the maximum amount available (expressed as a percentage) is then calculated.

EXAMPLE 1

Finely divided sodium tetraborate pentahydrate (Neobor ex Borax Europe Limited, 35 g), quartz (10 g) and kaolin (55 g) were dry mixed in a small mixer. Water was added slowly through a syringe until the mixture formed a crumb. The crumb was heated at 100° C. until it was completely dry. The dried product was transferred to a fire clay crucible and placed in an electric muffle furnace. The furnace was heated at a rate of 8 to 10° C. per minute up to a maximum of 850° C. where the temperature was held for 90 minutes. The furnace was then switched off and the crucible allowed to cool to ambient temperature in the furnace.

The product was removed, wrapped in a plastic film and broken with a hammer. The resulting composition was opaque with a creamy white colour and in particulate form.

The boron solubility of the product was determined as follows:

The calcined granules obtained were ground by hand using mortar and pestle. 10% slurries were made and placed into a flask which was then placed on to a shaker table stirring the material at 275 rpm. Aliquots were taken from time to time and passed through a 0.45 micron Millipore filter.

EXAMPLES 2-5

The method of Example 1 was followed with the exception that the maximum furnace temperature was 900° C., 950° C., 1000° C. and 1050° C., respectively.

The resulting compositions were similar in appearance to that of Example 1. The boron solubility of each product was then determined by the method described in Example 1.

The proportions of the raw materials used in Examples 1 to 5 were such that the percentages by weight of the oxides formed were as set out in Table 1 below. The measured solubility of the products obtained is also set out in Table 1 below.

TABLE 1

| Example | $B_2O_3$ (%) | $SiO_2$ (%) | $Al_2O_3$ (%) | $Na_2O$ (%) | CaO (%) | Boron solubility at 48 hours (%) |
|---|---|---|---|---|---|---|
| 1 | 21 | 43 | 25 | 10 | | 1.45 |
| 2 | 21 | 43 | 25 | 10 | | 0.43 |
| 3 | 21 | 43 | 25 | 10 | | 0.39 |
| 4 | 21 | 43 | 25 | 10 | | 0.22 |
| 5 | 21 | 43 | 25 | 10 | | 0.12 |

The remainder to 100% in each case was made up of impurities.

Further, the boron solubility (as a percentage of the maximum) profile for the products of Examples 1 to 5 over time is presented in Table 2 below.

TABLE 2

| | Days | | | | | | | | | | |
|---|---|---|---|---|---|---|---|---|---|---|---|
| Example | 0.04 | 0.08 | 0.63 | 1 | 2 | 4 | 5 | 7 | 11 | 21 | 24 | 35 |
| 1 | 0.62 | 0.84 | | | 1.45 | 2.32 | | | 3.66 | | 4.39 | |
| 2 | 0.29 | 0.36 | | | 0.43 | 0.96 | | | 2.00 | | 3.12 | |
| 3 | 0.21 | 0.28 | | | 0.39 | 0.90 | | | 1.76 | | 2.61 | |
| 4 | 0.16 | 0.17 | | | 0.22 | 0.52 | | | 1.18 | | 1.86 | |
| 5 | 0.11 | 0.12 | | | 0.13 | 0.22 | | | 0.54 | | 0.88 | |

EXAMPLE 6

Finely divided boric acid (Optibor ex Borax Europe Limited, 100 g), kaolin (200 g) and calcium carbonate (200 g) were dry mixed in a small mixer. Water was added slowly through a syringe until the mixture formed a crumb. The crumb was heated at 60° C. until it was completely dry. The dried product was transferred to a fire clay crucible and placed in an electric muffle furnace. The furnace was heated at a rate of 8 to 10° C. per minute up to a maximum of 750° C. where the temperature was held for 60 minutes. The furnace was then switched off and the crucible allowed to cool to ambient temperature in the furnace.

The product was removed, wrapped in a plastic film and broken with a hammer. The resulting composition was opaque with a creamy white colour and in particulate form.

The resulting composition was similar in appearance to that of Example 1.

The boron solubility of the product was determined as described in Example 1.

EXAMPLES 7 AND 8

The method of Example 6 was followed with the exception that the maximum furnace temperature was 850° C. and 996° C., respectively.

The resulting compositions were similar in appearance to that of Example 1.

The boron solubility of each product was then determined by the method described in Example 1.

The proportions of the raw materials used in Examples 6 to 8 were such that the percentages by weight of the oxides formed were as set out in Table 3 below. The measured solubility of the products obtained is also set out in Table 3 below.

TABLE 3

| Example | $B_2O_3$ (%) | $SiO_2$ (%) | $Al_2O_3$ (%) | $Na_2O$ (%) | CaO (%) | Boron solubility at 1 hour (%) |
|---|---|---|---|---|---|---|
| 6 | 17 | 27 | 22 | | 33 | 9.31 |
| 7 | 17 | 27 | 22 | | 33 | 1.86 |
| 8 | 17 | 27 | 22 | | 33 | 1.32 |

The remainder to 100% in each case was made up of impurities.

EXAMPLES 9 TO 11

The method of Example 6 was followed with the exceptions that
   a. in each case the amounts of Optibor, kaolin and calcium carbonate were 150 g, 100 g and 250 g respectively.
   b. The maximum furnace temperatures were 750° C., 850° C. and 996° C. respectively.

The resulting compositions were similar in appearance to that of Example 1.

The boron solubility of each product was then determined by the method described in Example 1.

The proportions of the raw materials used in Examples 9 to 11 were such that the percentages by weight of the oxides formed were as set out in Table 4 below. The measured solubility of the products obtained is also set out in Table 4 below.

TABLE 4

| Example | $B_2O_3$ (%) | $SiO_2$ (%) | $Al_2O_3$ (%) | $Na_2O$ (%) | CaO (%) | Boron solubility at 1 hour (%) |
|---|---|---|---|---|---|---|
| 9 | 27 | 15 | 12 | | 45 | 3.81 |
| 10 | 27 | 15 | 12 | | 45 | 2.34 |
| 11 | 27 | 15 | 12 | | 45 | 1.88 |

The remainder to 100% in each case was made up of impurities.

EXAMPLE 12

Finely divided sodium tetraborate pentahydrate (Neobor ex Borax Europe Limited, 1050 g), quartz (300 g), and kaolin (1650 g) were dry mixed in a small mixer. Water was added slowly through a syringe until the mixture formed a crumb. The crumb was heated at 60° C. until it was completely dry. The dried product was transferred to a fire clay crucible and placed in an electric muffle furnace. The furnace was heated at a rate of 8 to 10° C. per minute up to a maximum of 750° C. where the temperature was held for 90 minutes. The furnace was then switched off and the crucible allowed to cool to ambient temperature in the furnace.

The product was removed, wrapped in a plastic film and broken with a hammer. The resulting composition was opaque with a creamy white colour and in particulate form.

The resulting composition was similar in appearance to that of Example 1.

The boron solubility of the product was determined as described in Example 1.

EXAMPLES 13 AND 14

The method of Example 12 was followed with the exception that the maximum furnace temperature was 850° C. and 950° C., respectively.

The resulting compositions were similar in appearance to that of Example 1.

The boron solubility of each product was then determined by the method described in Example 1.

The proportions of the raw materials used in Examples 12 to 14 were such that the percentages by weight of the oxides formed were as set out in Table 5 below. The measured solubility of the products obtained is also set out in Table 5 below.

TABLE 5

| Example | $B_2O_3$ (%) | $SiO_2$ (%) | $Al_2O_3$ (%) | $Na_2O$ (%) | CaO (%) | Boron solubility at 24 hours (%) |
|---|---|---|---|---|---|---|
| 12 | 21 | 43 | 25 | 10 | | 16.00 |
| 13 | 21 | 43 | 25 | 10 | | 3.43 |
| 14 | 21 | 43 | 25 | 10 | | 1.90 |

The remainder to 100% in each case was made up of impurities.

Further, the boron solubility (as a percentage of the maximum) profile for the products of Examples 12 to 14 over time is presented in Table 6 below.

TABLE 6

| | Days | | | | | | | | | | |
|---|---|---|---|---|---|---|---|---|---|---|---|
| Example | 0.04 | 0.08 | 0.63 | 1 | 2 | 4 | 5 | 7 | 11 | 21 | 24 | 35 |
| 12 | 3.61 | | 12.25 | 16.00 | | 26.05 | | | 32.74 | 34.20 | | 42.23 |
| 13 | 0.79 | | 2.56 | 3.43 | | 6.88 | | | 9.58 | 11.83 | | 14.48 |
| 14 | 0.42 | | 1.46 | 1.90 | | 4.09 | | | 6.02 | 7.86 | | 11.51 |

EXAMPLES 15 TO 17

The method of Example 12 was followed with the exception that in each case the amounts of Neobor, quartz and kaolin were 74 g, 11 g and 116 g respectively.

The maximum furnace temperatures were 750° C., 850° C. and 950° C. respectively.

The resulting compositions were similar in appearance to that of Example 1.

The boron solubility of the products of Examples 15 and 16 was then determined by the method described in Example 1.

In the case of Example 17, to illustrate the effect that particle size may have on solubility/leachability, the product was milled and classified to −325 mesh and the solubility results compared with those for the product milled and classified to 100/+325 identified as Example 17a. 10% slurries were made and placed into a flask which was then placed on to a shaker table stirring the material at 275 rpm. Aliquots were taken from time to time and passed through a 0.45 micron Millipore filter. The amount of boron entered into solution as a proportion of the maximum amount available (expressed as a percentage) is then calculated.

The proportions of the raw materials used in Examples 15 to 17a were such that the percentages by weight of the oxides formed were as set out in Table 7 below. The measured solubility of the products obtained is also set out in Table 7 below.

TABLE 7

| Example | $B_2O_3$ (%) | $SiO_2$ (%) | $Al_2O_3$ (%) | $Na_2O$ (%) | CaO (%) | Boron solubility at 24 hours (unless otherwise indicated) (%) |
|---|---|---|---|---|---|---|
| 15 | 22 | 39 | 27 | 10 | | 13.88 |
| 16 | 22 | 39 | 27 | 10 | | 5.32 |
| 17 | 22 | 39 | 27 | 10 | | 0.97** |
| 17a | 22 | 39 | 27 | 10 | | 0.11** |

**Solubility at 1 hour

The remainder to 100% in each case was made up of impurities.

Further, the boron solubility (as a percentage of the maximum) profile for the products of Examples 15 and 16 over time is presented in Table 8 below.

TABLE 8

| | Days | | | | | | | | | | | |
|---|---|---|---|---|---|---|---|---|---|---|---|---|
| Example | 0.04 | 0.08 | 0.63 | 1 | 2 | 4 | 5 | 7 | 11 | 21 | 24 | 35 |
| 15 | 3.70 | | 11.88 | 13.83 | | 24.45 | | | 32.12 | 35.73 | | 37.65 |
| 16 | 1.18 | | 4.21 | 5.32 | | 10.51 | | | 14.51 | 17.26 | | 20.49 |

EXAMPLE 18

Finely divided sodium tetraborate pentahydrate (Neobor ex Borax Europe Limited, 78 g), and kaolin (122 g) were dry mixed in a small mixer. Water was added slowly through a syringe until the mixture formed a crumb. The crumb was heated at 60° C. until it was completely dry. The dried product was transferred to a fire clay crucible and placed in an electric muffle furnace. The furnace was heated at a rate of 8 to 10° C. per minute up to a maximum of 750° C. where the temperature was held for 90 minutes. The furnace was then switched off and the crucible allowed to cool to ambient temperature in the furnace.

The product was removed, wrapped in a plastic film and broken with a hammer. The resulting composition was opaque with a creamy white colour and in particulate form.

The resulting composition was similar in appearance to that of Example 1.

The boron solubility of the product was determined as described in Example 1.

EXAMPLES 19 AND 20

The method of Example 18 was followed with the exception that the maximum furnace temperature was 850° C. and 950° C., respectively.

The resulting compositions were similar in appearance to that of Example 1.

The boron solubility of the products of Examples 18 and 19 was then determined by the method described in Example 1.

In the case of Example 20, to illustrate the effect that particle size may have on solubility/leachability, the product was milled and classified to −325 mesh and the solubility results compared with those for the product milled and classified to 100/+325 identified as Example 20a. 10% slurries were made and placed into a flask which was then placed on to a shaker table stirring the material at 275 rpm. Aliquots were taken from time to time and passed through a 0.45 micron Millipore filter. The amount of boron entered into solution as a proportion of the maximum amount available (expressed as a percentage) is then calculated.

The proportions of the raw materials used in Examples 18 to 20a were such that the percentages by weight of the oxides formed were as set out in Table 9 below. The measured solubility of the products obtained is also set out in Table 9 below.

TABLE 9

| Example | $B_2O_3$ (%) | $SiO_2$ (%) | $Al_2O_3$ (%) | $Na_2O$ (%) | CaO (%) | Boron solubility at 24 hours (unless otherwise indicated) (%) |
|---|---|---|---|---|---|---|
| 18 | 24 | 35 | 29 | 10 | | 18.24 |
| 19 | 24 | 35 | 29 | 10 | | 4.63 |
| 20 | 24 | 35 | 29 | 10 | | 0.76** |
| 20a | 24 | 35 | 29 | 10 | | 0.17** |

**Solubility at 1 hour

The remainder to 100% in each case was made up of impurities.

Further, the boron solubility (as a percentage of the maximum) profile for the products of Examples 18 and 19 over time is presented in Table 10 below.

TABLE 10

| | Days | | | | | | | | | | |
|---|---|---|---|---|---|---|---|---|---|---|---|
| Example | 0.04 | 0.08 | 0.63 | 1 | 2 | 4 | −5 | 7 | 11 | 21 | 24 | 35 |
| 18 | 4.55 | | 16.12 | 18.24 | | 27.55 | | | 31.13 | 35.87 | | 36.43 |
| 19 | 1.12 | | 3.39 | 4.63 | | 9.06 | | | 12.67 | 15.38 | | 17.55 |

EXAMPLE 21

The method of Example 18 was followed with the exception that there were used 80 g Neobor and 120 g kaolin with the maximum furnace temperature being 900° C.

The resulting composition was similar in appearance to that of Example 1.

The boron solubility of the product was then determined by the method described in Example 1.

The proportions of the raw materials used in Examples 21 were such that the percentages by weight of the oxides formed were as set out in Table 11 below. The measured solubility of the product obtained is also set out in Table 11 below.

TABLE 11

| Example | $B_2O_3$ (%) | $SiO_2$ (%) | $Al_2O_3$ (%) | $Na_2O$ (%) | CaO (%) | Boron solubility at 24 hours (%) |
|---|---|---|---|---|---|---|
| 21 | 24 | 35 | 28 | 10 | | 5.69 |

The remainder to 100% in each case was made up of impurities.

EXAMPLES 22 TO 24

The method of Example 18 was followed with the exceptions that:

a. there were used 500 g Neobor and 500 g kaolin; and
b. the furnace was held at the maximum temperature for 60 minutes; the maximum furnace temperature used being respectively 750° C., 825° C. and 900° C.

The resulting compositions were similar in appearance to that of Example 1.

In each case, to illustrate the effect that particle size may have on solubility/leachability, the product was milled and classified to −325 mesh and the solubility results compared with those for the product milled and classified to 100/+325 identified as Examples 22a, 23a and 24a respectively. 10% slurries were made and placed into a flask which was then placed on to a shaker table stirring the material at 275 rpm. Aliquots were taken from time to time and passed through a 0.45 micron Millipore filter. The amount of boron entered into solution as a proportion of the maximum amount available (expressed as a percentage) is then calculated.

The proportions of the raw materials used in Examples 22 to 24a were such that the percentages by weight of the oxides formed were as set out in Table 12 below. The measured solubility of the product obtained is also set out in Table 12 below.

TABLE 12

| Example | $B_2O_3$ (%) | $SiO_2$ (%) | $Al_2O_3$ (%) | $Na_2O$ (%) | CaO (%) | Boron solubility at 24 hours (%) |
|---|---|---|---|---|---|---|
| 22 | 31 | 29 | 24 | 14 | | 37 |
| 22a | 31 | 29 | 24 | 14 | | 18 |
| 23 | 31 | 29 | 24 | 14 | | 21 |

TABLE 12-continued

| Example | $B_2O_3$ (%) | $SiO_2$ (%) | $Al_2O_3$ (%) | $Na_2O$ (%) | CaO (%) | Boron solubility at 24 hours (%) |
|---|---|---|---|---|---|---|
| 23a | 31 | 29 | 24 | 14 | | 10 |
| 24 | 31 | 29 | 24 | 14 | | 7 |
| 24a | 31 | 29 | 24 | 14 | | 3 |

The remainder to 100% in each case was made up of impurities.

Further, the boron solubility (as a percentage of the maximum) profile for the products of Examples 22 to 24a over time is presented in Table 13 below.

TABLE 13

| Exam-ple | Days |  |  |  |  |  |  |  |  |  |  |  |
|---|---|---|---|---|---|---|---|---|---|---|---|---|
|  | 0.04 | 0.08 | 0.63 | 1 | 2 | 4 | 5 | 7 | 11 | 21 | 24 | 35 |
| 22 |  |  |  | 37 | 41 |  | 43 | 46 |  |  |  |  |
| 22a |  |  |  | 18 | 26 |  | 39 | 43 |  |  |  |  |
| 23 |  |  |  | 21 | 29 |  | 33 | 35 |  |  |  |  |
| 23a |  |  |  | 10 | 13 |  | 21 | 24 |  |  |  |  |
| 24 |  |  |  | 7 | 11 |  | 16 | 21 |  |  |  |  |
| 24a |  |  |  | 3 | 5 |  | 9 | 10 |  |  |  |  |

EXAMPLES 25 TO 58

The method of Example 1 was followed using raw material mixtures having the compositions and conditions as set out in Table 14 below:

TABLE 14

| Example | Optibor (g) | Neobor (g) | Quartz (g) | Kaolin (g) | $CaCO_3$ (g) | $Ca(OH)_2$ (g) | Wollastonite (g) | Time (min) | Temp. (° C.) |
|---|---|---|---|---|---|---|---|---|---|
| 25 |  | 30 |  | 70 |  |  |  | 90 | 1000 |
| 26 |  | 30 |  | 70 |  |  |  | 90 | 1100 |
| 27 |  | 30 |  | 70 |  |  |  | 90 | 1250 |
| 28 | 42 |  |  |  | 14 |  | 44 | 90 | 850 |
| 29 | 42 |  |  |  | 14 |  | 44 | 90 | 950 |
| 30 |  | 20 | 35 | 45 |  |  |  | 90 | 850 |
| 31 |  | 20 | 35 | 45 |  |  |  | 90 | 950 |
| 32 |  | 20 | 35 | 45 |  |  |  | 90 | 1050 |
| 33 |  | 25 | 20 | 55 |  |  |  | 90 | 900 |
| 34 |  | 25 | 20 | 55 |  |  |  | 90 | 1100 |
| 35 |  | 25 | 20 | 55 |  |  |  | 90 | 1150 |
| 36 | 20 |  |  |  |  | 15 | 65 | 90 | 1000 |
| 37 | 20 |  |  |  |  | 15 | 65 | 90 | 1050 |
| 38 | 20 |  |  |  |  | 15 | 65 | 90 | 1100 |
| 39 |  | 26 | 15 | 47 |  |  | 13 | 90 | 960 |
| 40 |  | 26 | 15 | 47 |  |  | 13 | 90 | 1000 |
| 41 |  | 25 | 29 | 30 |  |  | 13 | 30 | 960 |
| 42 |  | 20 | 25 | 45 |  |  | 16 | 30 | 1050 |
| 43 |  | 25 | 10 | 49 |  |  | 16 | 30 | 995 |
| 44 | 10 | 15 | 10 | 49 |  |  | 16 | 30 | 935 |
| 45 | 6 | 15 | 30 | 31 |  |  | 18 | 30 | 880 |
| 46 | 10 | 15 | 23 | 43 |  |  | 10 | 30 | 975 |
| 47 | 3 | 18 | 13 | 50 |  |  | 18 | 30 | 975 |
| 48 |  | 25 | 29 | 30 |  |  | 16 | 90 | 930 |
| 49 |  | 20 | 25 | 45 |  |  | 10 | 90 | 1050 |
| 50 |  | 25 | 10 | 49 |  |  | 16 | 90 | 995 |
| 51 |  | 15 | 10 | 49 |  |  | 16 | 90 | 920 |
| 52 | 6 | 15 | 30 | 31 |  |  | 18 | 90 | 850 |
| 53 | 10 | 15 | 23 | 43 |  |  | 10 | 90 | 935 |
| 54 | 3 | 18 | 13 | 50 |  |  | 18 | 90 | 995 |
| 55 |  | 20 | 20 | 50 |  |  | 10 | 90 | 1095 |
| 56 |  | 20 | 20 | 50 |  |  | 10 | 30 | 1115 |
| 57 |  | 25 | 15 | 50 |  |  | 10 | 90 | 1060 |
| 58 |  | 25 | 15 | 50 |  |  | 10 | 30 | 1080 |

The resulting compositions were similar in appearance to those of Example 1.

Solubility tests were carried out in the following manner:

The calcined granules from Examples 25 to 58 were ground by hand using mortar and pestle and passed through a 60 mesh screen. Material that was −60 mesh was retained; 1.00 g was added to 50 ml of room temperature deionised water in a 150 ml beaker, together with a magnetic stir bar and left on a conventional stir plate at a setting of 5. The solution was then vacuum filtered through weighed VWR grade 615 filter paper; the liquid solution weight was recorded; solid residue weight after drying overnight was recorded, the solubility was normalised to a surface area of 1 sq meter per gram using Malvern apparatus.

The proportions of the raw materials used in Examples 25 to 58 were such that the percentages by weight of the oxides formed were as set out in Table 15 below. The measured solubility of the products obtained is set out in Table 15 below.

TABLE 15

| Example | $B_2O_3$ (%) | $SiO_2$ (%) | $Al_2O_3$ (%) | $Na_2O$ (%) | CaO (%) | Boron solubility at 24 hours (%) |
|---|---|---|---|---|---|---|
| 25 | 18 | 40 | 32 | 8 | | 1.10 |
| 26 | 18 | 40 | 32 | 8 | | 1.11 |
| 27 | 18 | 40 | 32 | 8 | | 0.75 |
| 28 | 32 | 30 | | | 38 | 12.01 |
| 29 | 32 | 30 | | | 38 | 7.28 |
| 30 | 8 | 59 | 13 | 3 | 16 | 2.20 |
| 31 | 8 | 59 | 13 | 3 | 16 | 0.82 |
| 32 | 8 | 59 | 13 | 3 | 16 | 0.6 |
| 33 | 15 | 53 | 25 | 7 | | 4.92 |
| 34 | 15 | 53 | 25 | 7 | | 0.69 |
| 35 | 15 | 53 | 25 | 7 | | 0.56 |
| 36 | 13 | 40 | | | 46 | 28.57 |
| 37 | 13 | 40 | | | 46 | 20.15 |
| 38 | 13 | 40 | | | 46 | 19.83 |
| 39 | 15 | 50 | 21 | 7 | 7 | 0.80 |
| 40 | 15 | 50 | 21 | 7 | 7 | 0.69 |
| 41 | 14 | 57 | 13 | 6 | 9 | 1.65 |
| 42 | 11 | 58 | 20 | 5 | 6 | 0.49 |
| 43 | 14 | 48 | 22 | 6 | 9 | 0.54 |
| 44 | 16 | 48 | 22 | 4 | 9 | 0.72 |
| 45 | 12 | 60 | 14 | 4 | 9 | 2.31 |
| 46 | 15 | 55 | 19 | 4 | 6 | 0.81 |
| 47 | 12 | 51 | 22 | 4 | 10 | 0.59 |
| 48 | 14 | 57 | 13 | 6 | 9 | 2.17 |
| 49 | 11 | 57 | 19 | 5 | 5 | 0.46 |
| 50 | 14 | 48 | 22 | 6 | 9 | 0.50 |
| 51 | 16 | 48 | 22 | 4 | 9 | 0.67 |
| 52 | 12 | 60 | 14 | 4 | 9 | 3.11 |
| 53 | 15 | 55 | 19 | 4 | 6 | 0.72 |
| 54 | 12 | 51 | 22 | 4 | 10 | 0.50 |
| 55 | 11 | 55 | 22 | 5 | 6 | 0.44 |
| 56 | 11 | 55 | 22 | 5 | 6 | 0.48 |
| 57 | 14 | 50 | 22 | 6 | 6 | 0.47 |
| 58 | 14 | 50 | 22 | 6 | 6 | 0.48 |

The remainder to 100% in each case was made up of impurities.

EXAMPLE 59

An industrial rotary calciner was conditioned overnight by heating and feeding 18 kg/h of powder kaolin and then further conditioned by adding an additional 126 kg of free kaolin over a 1.6 hour period just before start of the feed material. Feed was added over a 15 hour period at a rate of 180 kg/h. The feed consisted of 95% pellets having the composition (by weight) 45% kaolin, 25% quartz, 20% Neobor, and 10% wollastonite along with 5% powder kaolin. The average dwell time in the calciner was 60 minutes. The calciner was operated at a constant speed of rotation of 2.5 rpm. The hottest point was designed near the frontend of the calciner and two peak temperatures of 910° C. and 920° C. were investigated. A temperature gradient was created such that outlet temperature ranged from 469° C. to 525° C. An air screening system involving a cyclone captured a mixture of kaolin powder and pellets and a filter captured free kaolin. 2500 kg of product was made and ground to the desired particle size using conventional milling equipment.

EXAMPLE 60

An industrial rotary calciner was conditioned overnight by heating and then feeding powder kaolin for 2 hours at 146 kg/h just before start of the feed material. Feed was added over a 30 hour period at a rate of 196 kg/h. The feed consisted of pellets having the composition (by weight) 45% kaolin, 25% quartz, 20% Neobor, and 10% wollastonite at a rate of 146 kg/h and powder kaolin at a rate of 50 kg/h. The average dwell time in the calciner was varied from 60 minutes to 90 minutes. The calciner was operated at a constant speed of rotation of 2.5 rpm. The hottest point was designed near the frontend of the calciner and three peak temperatures of 940° C., 960° C., and 980° C. were investigated. A temperature gradient was created such that outlet temperature ranged from 493° C. to 577° C. An air screening system involving a cyclone captured a mixture of kaolin powder and pellets and a filter captured free kaolin. The calcined products were ground to the desired particle size using conventional milling equipment. The boron solubility, as measured at 24 hours and normalised to a surface area of 1 sq. meter per gram, of the materials produced at 950° C. and a dwell time of 60 minutes was 1.50% by weight, and at 950° C. and a dwell time of 90 minutes it was 1.33%.

EXAMPLE 61

An industrial rotary calciner, 25 m long and inner diameter of 1.1 m was conditioned for 12 hours by heating and introducing 2.6 tons of powder kaolin and then introducing 200 kg of kaolin over a 1 hour period just before commencing the feed. Feed was added over a 36 hour period at a rate of 290 kg/h. The feed consisted pellets having the composition (by weight) 45% kaolin, 25% quartz, 20% Neobor, and 10% wollastonite at a rate of 250 kg/h and powder kaolin at a rate of 40 kg/h. The average dwell time in the calciner was 6 to 8 hours. The calciner was operated at a constant speed of rotation of 0.8 rpm. The temperatures at the hottest point, designed near the backend of the calciner, were varied between 709° C. and 890° C. The calcined products were ground to the desired particle size using conventional milling equipment. The boron solubility, as measured at 24 hours and normalised to a surface area of 1 sq meter per gram, of the material was 0.92% by weight.

EXAMPLE 62

An industrial roller kiln was used to calcine the composition. A powder composition (by weight) of 45% kaolin, 25% quartz, 20% Neobor, and 10% wollastonite was pressed in tile sizes of 5×10 cm at a pressure of 350 kg/cm² using a conventional industrial hydraulic tile press. Tile thicknesses of 6 mm and 12 mm and moisture contents of 10% and 15% by weight were investigated. Some tiles were pre-dried before firing while others were directly fired with a pre-drying step. All tiles were placed on a refractory support and were double fired, first at 540° C. involving a thermal rate increase of 5.4°

C. for 100 minutes and then at 1050° C. for 50 minutes. The resultant tiles were milled to the desired particle size using a conventional grinding mill. The boron solubility, as measured at 24 hours and normalised to a surface area of 1 sq meter per gram, of the material was 1.15% by weight.

EXAMPLE 63

Larger tiles with size of 250×300 mm and 8 mm thick were successfully prepared as in Example 62 and the same positive results were obtained.

EXAMPLE 64

An industrial roller kiln was used to calcine the composition. Tiles were prepared using a first layer of a powder composition (by weight) consisting of 45% kaolin, 25% quartz, 20% Neobor, and 10% wollastonite and a second layer of 4 mm of kaolin powder. The tiles were pressed to sizes of 250×330×20 mm at a pressure of 350 kg/cm$^2$ using a conventional industrial hydraulic tile press. The tiles showed some lamination due to their high thickness but the bonding between the composition layer and the kaolin layer was good. The tiles were turned upside down and placed on a wire mesh. The tiles were double fired, first to 540° C. involving a thermal rate increase of 5.4° C. for 100 minutes and then at 1050° C. for 40 minutes and 50 minutes. The resultant tiles were milled to the desired particle size using a conventional grinding mill.

EXAMPLE 65

Samples of composition as described in Example 1 were incorporated into laboratory produced OSB boards (3 boards, each of approximate dimension 0.5 m×0.5 m×15 mm thick) at a level of 1.18% Boric Acid Equivalent (BAE) w/w. In addition, similar sized OSB boards treated with zinc borate (Borogard ZB) at a loading of 1.28% BAE w/w were also produced.

Six separate samples from each board type were cut (dimensions of 25 mm by 25 mm by thickness) and were leached underwater for a 2 week period. At the conclusion of the leaching, the samples were dried and then destructively assayed to determine the post-leaching boron content. Average assay results showed that the sample of the OSB treated with a material from the present invention lost 22% of the initial boron load compared to samples of the zinc borate treated OSB which lost 40% of the initial boron.

EXAMPLE 66

Aspen wood composite oriented strand boards (OSB) were produced using pMDI resin with low and high borate preservative loadings of Dehybor® sodium borate ($Na_2B_4O_7$), Borogard® ZB zinc borate ($2ZnO.3B_2O_3.3.5H_2O$), colemanite ($2CaO.3B_2O_3.5H_2O$), and the calcined low solubility borate composition from Example 14. Low borate loadings were 0.75% BAE (boric acid equivalent) and high loadings were 1.5% BAE, based on the weight of the wood composite. Boric acid ($H_3BO_3$) equivalent is a commonly used convention for comparing various borates on an equivalent contained-boron basis. Untreated oriented strand boards were also produced.

Before decay testing, one small board (6 cm×15 cm) was cut from larger boards received. These small boards were end sealed and weathered according to the AWPA E11 leaching test. In this test, the boards were submerged for a 14 day period where water changes occurred every 48 hours. After the weathering test, the small boards were dried and test samples were cut from the boards. A total of four samples measuring 50 mm×25 mm×20 mm were cut from each weathered board for the decay testing.

The four samples cut from each treatment board were tested according to a standard European decay test protocol EN113. The samples were first placed in plastic containers and autoclaved at 120° C. for 30 minutes to ensure sterilization prior to mono-culture decay testing.

Aqueous solutions of 2.0% malt and 2.0% agar were prepared and then autoclaved at 120° C. for 30 minutes. The solutions were allowed to cool to between 50° C. and 80° C. and were then poured into pre-autoclaved French square jars (dimensions: height=7 cm, width/length=2 cm) with approximately 40 ml per jar. The jars were placed into an incubator and kept at 26° C. (±2° C.) and observed for two days. After the jars were ensured to be free of contamination, they were inoculated with a mature culture of *Postia* placenta (brown rot fungi). Inoculated jars were incubated at 26° C. (±2° C.) until the mycelium covered between ⅔ and ⁹⁄₁₀ of the solid agar substrate.

All specimens were placed on sterilized plastic mesh to prevent agar contact and water logging. The autoclaved wood composite samples were then placed onto the fungal cultures. The jar lids were loosely screwed on to allow for air exchange. Following introduction of the samples to the cultures, the jars were again incubated at 26° C. (±2° C.) for a period of twelve weeks. After this period the samples were removed from the jars, cleaned, and oven dried at 40° C. for 3 to 4 days until the consistent wood weights were achieved. All test samples were weighed to determine the percent weight loss resulting from the fungal exposure.

The decay results are shown in the Table below, and are expressed as average percent weight loss of the wood composite samples after 12 weeks of fungal decay exposure. These results show that the low solubility calcined product from Example 14 was effective for inhibiting fungal decay, with results which were comparable to the other borate based products.

Decay Results

Percent Weight Loss after 12 Weeks Exposure

| Borate Preservative | Borate Loading (Wt. % BAE) | Average % Wt. Loss | % error |
|---|---|---|---|
| Control | 0 | 23.05 | 0.53 |
| Example 14 Product | 0.75 | 0.38 | 0.06 |
| Example 14 Product | 1.5 | 0.45 | 0.06 |
| Borogard ® ZB | 0.75 | 0.56 | 0.04 |
| Borogard ® ZB | 1.5 | 0.64 | 0.11 |
| Dehybor ® | 0.75 | 0.06 | 0.09 |
| Dehybor ® | 1.5 | 0.15 | 0.27 |
| Colemanite | 0.75 | 0.41 | 0.26 |
| Colemanite | 1.5 | 0.80 | 0.07 |

The invention claimed is:
1. A process which comprises adding a boron-containing material to a substrate, wherein the boron-containing material is a comminuted, heterogeneous boron-containing composition, which composition is obtainable by a process which comprises:
(a) heating to a temperature sufficiently high that calcination occurs but insufficient for the formation of a homogeneous melt a mixture comprising components capable, under the conditions of heating, of forming the oxides $B_2O_3$ and $SiO_2$ and optionally $Al_2O_3$, $Na_2O$ and/or CaO in proportions such that the relative percentages by weight of said oxides based on the total weight of said oxides, are as follows:
5 to 35% $B_2O_3$,
10 to 65% $SiO_2$,
0 to 35% $Al_2O_3$,
0 to 20% $Na_2O$, and
0 to 50% CaO; and then
(b) comminuting the resulting composition,
and wherein the substrate is flammable, with the boron-containing material being added as a flame retardant, or the substrate is susceptible to infestation by pests, with the boron-containing material being added as a pesticide, or the substrate is a heavy clay body, an agricultural product, a polymer or rubber, wood, including wood-plastics composites, an intumescent material, a paint or polymer coating, a soap or detergent, a cosmetic, an industrial fluid, water or gypsum wallboard;
and wherein the substrate is not a steel slab.

2. A process according to claim 1, wherein the boron-containing material is a comminuted, heterogeneous boron-containing composition, which composition is obtainable by a process which comprises:
(a) heating to a temperature sufficiently high that calcination occurs but insufficient for the formation of a homogeneous melt a mixture comprising components capable, under the conditions of heating, of forming the oxides $B_2O_3$ and $SiO_2$ and optionally $Al_2O_3$, $Na_2O$ and/or CaO in proportions such that the relative percentages by weight of said oxides, based on the total weight of said oxides, are as follows:
5 to 35% $B_2O_3$;
10 to 65% $SiO_2$;
0 to 35% $Al_2O_3$; and
up to 20% $Na_2O$ and/or up to 50% CaO;
with the proviso that said $B_2O_3$ content is not 10 to 18%, when the other contents are as follows:
40 to 65% $SiO_2$,
17 to 32% $Al_2O_3$,
4 to 9% $Na_2O$, and
0 to 10% CaO, and then
(b) comminuting the resulting composition.

3. A process according to claim 2, wherein the boron-containing composition contains
2 to 20% $Na_2O$, and/or
5 to 50% CaO.

4. A process according to claim 2, in which said proportions of said oxides are as follows:
5 to 35% $B_2O_3$,
10 to 65% $SiO_2$,
0 to 35% $Al_2O_3$,
above 9 to 20% $Na_2O$, and/or
above 10 to 50% CaO.

5. A process according to claim 2 in which said $Al_2O_3$ content is 10 to 35% by weight.

6. A process according to claim 2 in which said proportions of said oxides are as follows:
5 to 35% $B_2O_3$,
10 to 60% $SiO_2$,
10 to 35% $Al_2O_3$, and
$Na_2O$ in an amount of 9.5% to 15%, and/or
CaO in an amount of 11 to 50%.

7. A process according to claim 2 in which said proportions of said oxides are as follows:
12 to 25% $B_2O_3$,
25 to 55% $SiO_2$,
20 to 35% $Al_2O_3$, and
5 to 16% $Na_2O$.

8. A process according to claim 2 in which said proportions of said oxides are as follows:
10 to 30% $B_2O_3$,
12 to 42% $SiO_2$,
0 to 25% $Al_2O_3$, and
30 to 50% CaO.

9. A process according to claim 2 in which said proportions of said oxides are as follows:
5 to 20% $B_2O_3$,
45 to 65% $SiO_2$,
10 to 25% $Al_2O_3$,
2 to 10% $Na_2O$, and
4 to 20% CaO.

10. A process according to claim 2 in which said mixture is heated to 700 to 1120° C.

11. A glaze composition which comprises a comminuted, heterogeneous boron-containing composition, which composition is obtainable by a process which comprises:
(a) heating to a temperature sufficiently high that calcination occurs but insufficient for the formation of a homogeneous melt a mixture comprising components capable, under the conditions of heating, of forming the oxides $B_2O_3$ and $SiO_2$ and optionally $Al_2O_3$, $Na_2O$ and/or CaO in proportions such that the relative percentages by weight of said oxides, based on the total weight of said oxides, are as follows:
5 to 35% $B_2O_3$;
10 to 65% $SiO_2$;
0 to 35% $Al_2O_3$; and
up to 20% $Na_2O$ and/or up to 50% CaO;
with the proviso that said $B_2O_3$ content is not 10 to 18%, when the other contents are as follows:
40 to 65% $SiO_2$,
17 to 32% $Al_2O_3$,
4 to 9% $Na_2O$, and
0 to 10% CaO, and then
(b) comminuting the resulting composition.

12. A glaze composition according to claim 11, which also contains boron-free frit.

13. A method of glazing a ceramic article which method comprises applying to the surface of the ceramic article a glaze composition as claimed in claim 11, and firing the ceramic article.

14. A process for preparing a comminuted, heterogeneous boron-containing composition, which process comprises:
(a) heating in a rotary calciner in the presence of refractory powder to a temperature sufficiently high that calcination occurs but insufficient for the formation of a homogeneous melt a composition in particulate form comprising a mixture of components capable, under the conditions of heating, of yielding the oxides $B_2O_3$ and $SiO_2$ and optionally $Al_2O_3$, $Na_2O$ and/or CaO in proportions such that the relevant percentages by weight of said oxides based on the total weight of said oxides, are as follows:
5 to 35% $B_2O_3$,
10 to 65% $SiO_2$,
0 to 35% $Al_2O_3$,
0 to 20% $Na_2O$, and
0 to 50% CaO; and then
(b) comminuting the resulting composition.

15. A process according to claim 14, in which there are used as starting materials by weight, based on the total weight of those ingredients:
  Sodium borate or boric acid 10-60%,
  Quartz 0-60%,
  Kaolin 0-80%,
  Wollastonite 0-60%,
  Calcium carbonate 0-50%, and
  Calcium hydroxide 0-15%,
with the proviso that some quartz and/or some kaolin is employed.

* * * * *

UNITED STATES PATENT AND TRADEMARK OFFICE
CERTIFICATE OF CORRECTION

PATENT NO. : 8,623,423 B2  
APPLICATION NO. : 12/808795  
DATED : January 7, 2014  
INVENTOR(S) : Simon Gregson Cook Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this
Eighteenth Day of August, 2015

Michelle K. Lee
*Director of the United States Patent and Trademark Office*